May 11, 1965

C. A. CLARK 3,182,745

FREE PISTON FLUID PRESSURE TRANSDUCER

Filed June 30, 1960

INVENTOR
CHESTER A. CLARK

BY

ATTORNEY

May 11, 1965     C. A. CLARK     3,182,745
FREE PISTON FLUID PRESSURE TRANSDUCER
Filed June 30, 1960     2 Sheets-Sheet 2
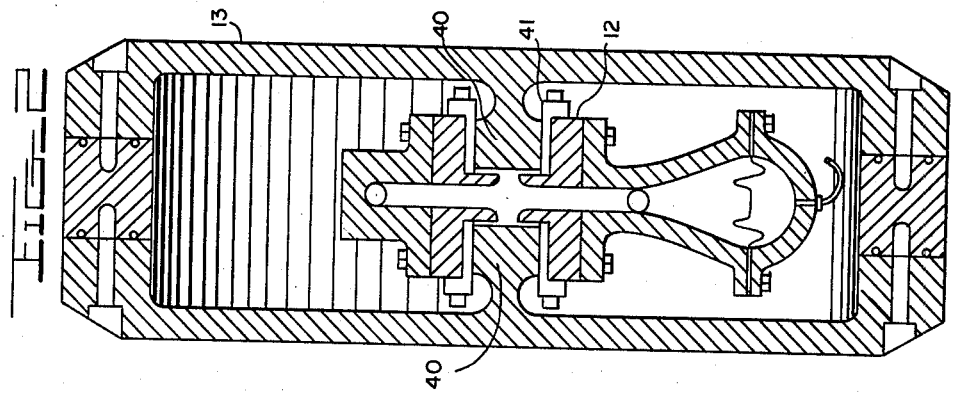
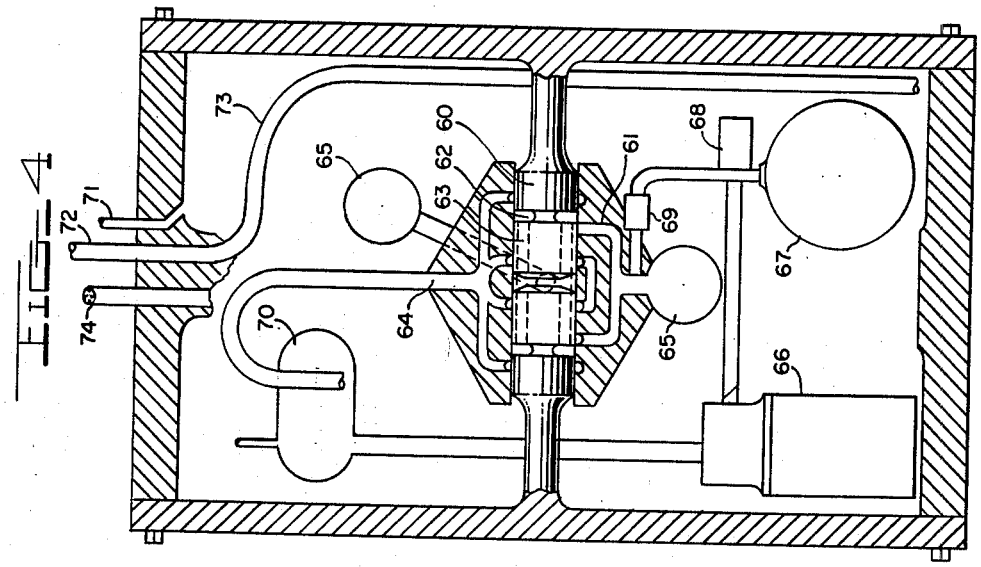
INVENTOR
CHESTER A. CLARK
BY
ATTORNEY

United States Patent Office 3,182,745
Patented May 11, 1965

3,182,745
FREE PISTON FLUID PRESSURE TRANSDUCER
Chester A. Clark, Waldorf, Md., assignor to the United States of America as represented by the Secretary of the Navy
Filed June 30, 1960, Ser. No. 40,119
8 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

The present invention relates to sound transducers and particularly to a transducer for converting the energy of a steady fluid flow to sound waves.

In the field of underwater exploration sound waves have been used extensively for seeking out obstructions at relatively short ranges. High frequency electrical systems of moderate power have been used at these ranges in order to obtain the resolution necessary. High power and low frequency are more satisfactory for long range systems where the large area covered makes high resolution unnecessary. These necessary characteristics may be advantageously supplied by using the simple and reliable fluid pressure form of transducer.

Two forms of such a device have been advanced in earlier filed patent applications Ser. No. 856,306, filed Nov. 30, 1959, now Patent No. 3,109,408, and Ser. No. 815,234, filed May 22, 1962, now Patent No. 3,100,122. In the earlier of these applications vibratory energy was introduced in the pressurized fluid before it was passed into the transducer. While this simplified the structure of the transducer, there were losses from the conduits supplying the pressurized fluid which reduced the efficiency and directivity below the level required for certain applications of the device. In the later application a rotary valve was located within the transducer, but was driven by a mechanical link through the transducer housing. Such an arrangement is difficult to use at great depths in water because of the sealing problem.

An object of the present invention is, therefore, to provide a mechanical sound transducer wherein all moving parts are completely within a sealed housing.

Another object of the invention is to provide a mechanical sound transducer having a minimum of moving parts.

Another object of the invention is to provide a pressurized fluid transducer wherein mechanical vibrations initiate solely within the transducer and the operating frequency corresponds to the natural vibration frequency of the transducer.

These and other objects of the invention will be best understood with reference to the accompanying drawings wherein:

FIG. 2 shows a cross-section of the complete transducer of FIG. 1 below the section line A—A;

FIG. 4 shows an edge view of another embodiment of the invention with portions broken away to show inner detail.

Figure 1:
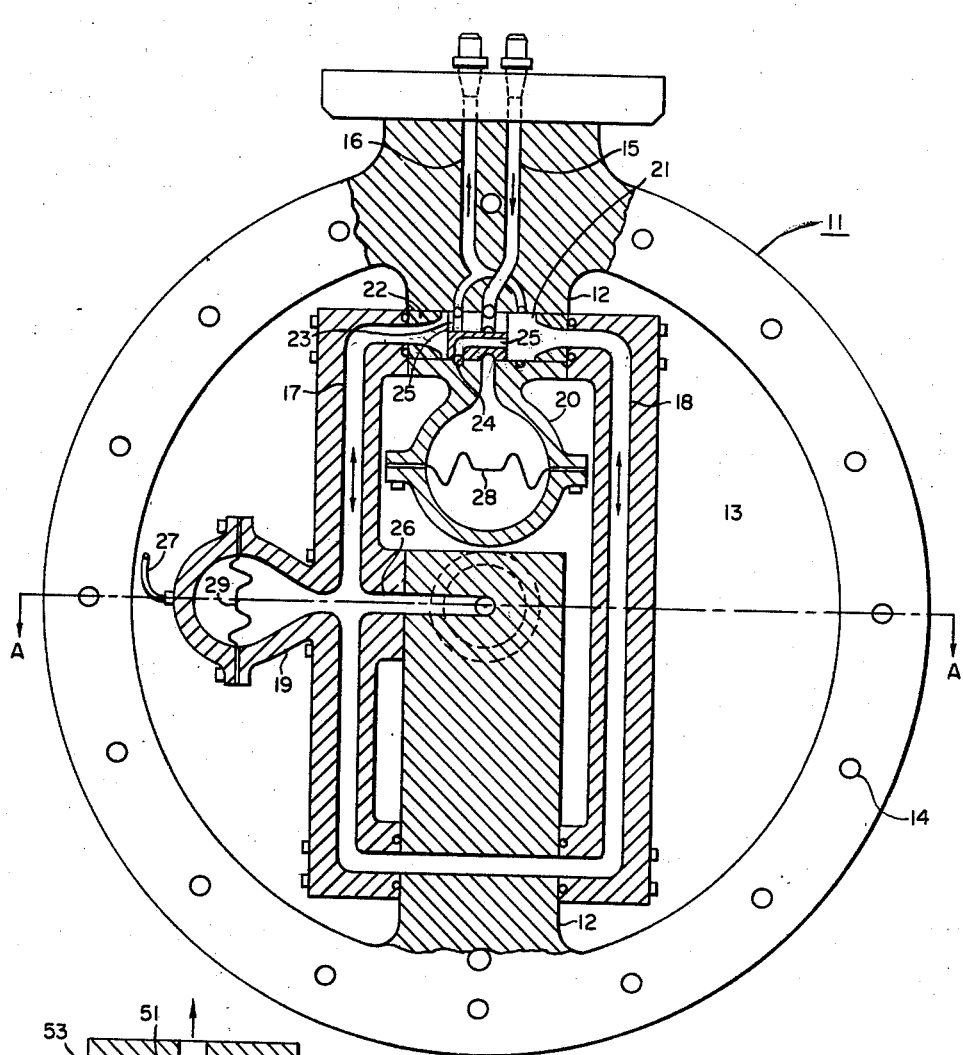
FIG. 1 shows a front view of one embodiment of the invention with a forward diaphragm removed and part of the interior walls broken away to reveal inner detail.

Referring more particularly to FIG. 1 the embodiment of the transducer shown therein comprises a housing 11 which has the general overall exterior shape of a pocketwatch, with internal projections 12 to support a driving mechanism. The rear wall 13 forms a flexible diaphragm and provides a broad outer surface of radiation. A similar diaphragm has been removed from the front of the transducer to permit an interior view. These diaphragms may be fastened in place by screws as through holes 14 or any other suitable fastening. Gaskets may be used, if necessary. Supply conduits 15 and 16 are cast or machined through the upper portion of the housing and the projection 12 to admit pressurized fluid to and from the driving means.

The driving means consists of a valve 23, feeder conduits 17 and 18, a cylinder and piston assembly, and resilient energy storage devices 19 and 20. To house the valve 23 a cylinder 21 is machined in one of the projections 12 as a continuation of the supply conduits. Conduit 15 is coupled to the center of the valve cylinder and for purposes of illustration will be designated as the input. Conduit 16 in this case becomes an output path. The latter couples near both ends of cylinder 21. End portions 22 are provided at either end of the cylinder are designed to limit the movement of a piston therein without closing the ends of the cylinder to fluid flow. The end portions are threaded or otherwise engage the cylinder wall, so as to be removable for insertion of a piston.

The piston 23 is somewhat longer than half the distance between end portions 22. Two grooves 24 extend circumferentially around the piston and are spaced so as to register with the left hand branch of conduit 16 and condiut 15 when the cylinder occupies the left end of the cylinder. A similar, but inverted, relationship is therefore obtained in the right hand end of the cylinder by spacing the second branch of conduit 16 an equal distance from conduit 15. The piston also defines a pair of conduits 25, each coupled to one end of the cylinder and to the circumferential groove in the piston furthest from this one end.

Each end of the valve cylinder is connected to one end of one of the feeder conduits 17 and 18. Conduit 17 is purposely made shorter than conduit 18 for reasons which will become obvious. Both conduits at their remote ends empty into a common conduit 26.

Gas spring storage members 19 and 20 are connected to the common conduit 26 and the input supply conduit 15. The compliance of these members can be controlled by supplying gas under pressure to the rear face of the resilient membranes 28 and 29 which divide each of the storage members into a gas and a fluid filled compartment.

The common conduit terminates between the internal faces of the two driving pistons 40, as is best shown in FIG. 2. These pistons slide freely in a cylinder defined by one of the projections 12. Bushings 41 may be used to provide a more suitable and replaceable wear surface or to provide a surface resistant to any chemical attack from the pressurized fluid. Each driving piston is integrally connected to one of the diaphragms 13.

To operate the transducer, pressurized fluid from a pump (not shown) is forced into the supply conduit 15 in FIG. 1 the fluid then enters one groove 24 of the valve piston resting at one end of cylinder 21 and escapes through a remote piston face through one of the conduits 25. The rising pressure in feeder conduit 17 or 18, as the case may be, drives the valve piston to the opposite end of the valve cylinder. Fluid then enters the second of the valve grooves and conduits driving the valve piston to its original position. Hammering in the input supply conduit, due to rapid switch action of the valve, is prevented by the storage device 20. The piston is brought to rest by pressurization of the fluid trapped in its path on each half cycle, the end portions 22 being spaced to avoid contact with the operating valve.

The pressure pulses produce fluid waves which pass down the feeder conduits to the driving pistons, where they are transmitted through the diaphragms of the transducer to a surrounding medium. The feeder conduits differ in length by an odd number of half wavelengths in order that the waves from both will be in-phase as they enter the common conduit 26. By making each an odd number of quarter wavelengths more efficient coupling of wave energy produced by the valve to the driving piston is achieved.

Storage device 19 absorbs switching transients in the feeder conduits. The pressure in the back chamber may also be adjusted to match the natural frequency of the driving piston to that of the valve. The lengths of the feeder conduits cause reflections from the driving pistons to cancel as the fluid flows into conduit 16 from its branches at the valve.

Figure 3:
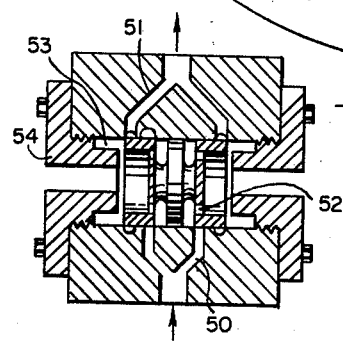
FIG. 3 shows a modified valve assembly for the structure shown in FIG. 1.

FIG. 3 shows an alternate form of valve for the transducer in FIGS. 1 and 2. The input supply conduit 50 in this case has two branches leading to the valve. The valve has two circumferential grooves symmetrically located along the valve cylinder and spaced so that one and only one of them will communicate with an input branch at any one time.

The output conduit 51 likewise has two branches symmetrically located along the valve cylinder, but spaced a greater distance apart so as to register with one of the grooves in the valve at the positions of greater displacement. Internal conduits 52 are provided from the grooves to the nearest end of the valve. Since the internal conduits opening from opposite ends of the valve do not pass one another a greater portion of the cross-section of the valve can be devoted to the conduits at each end.

The end portions 54 may be undercut to provide a fluid pocket 53 when the pressurized fluid has appreciable compressibility. These pockets cushion the valve at each end of its travel. When liquids are used these pockets generally will not be necessary.

FIG. 4 shows another embodiment of the invention which is particularly useful for high power applications. In this device the driving piston 60 also serves as a valve piston. For clarity the pistons are shown slightly displaced from their normal rest position where they are in contact. In this position fluid entering groove 62 from conduit 61 passes through the internal valve conduits 63 to force the pistons apart.

As the pistons reach their maximum displacement the grooves register with branches of the output supply conduit 64 releasing the pressurized fluid between the pistons. The inner ends of the pistons also uncover additional branches of the output conduit to aid in releasing this fluid. Gas springs 65 communicate with the space between the pistons and the input supply conduit for the purposes set forth in regard to the species of FIGS. 1 and 2.

If desired, a complete fluid system can be employed within the transducer housing. This requires a pump 66 to maintain a head of fluid under pressure in an accumulator 67, the latter being, for example, merely a strong container for compressible fluids or a large gas spring for liquids. A pressure responsive switch may be employed to control the pump and thus insure constant accumulator reserve. A remotely operated valve 69 releases fluid to the input supply conduit to operate the transducer. Fluid returns to the pump through the vented reservoir 70.

Ambient pressure within the housing is maintained by introducing gas under pressure through a pressuring conduit 71. A scavenging conduit 72 is provided to permit removal of any liquids which may leak into the housing either from the pumping system or the outside medium surrounding the housing.

Power to operate the pump and remote valve may be supplied through an electrical cable 74 sealed through the transducer wall in a conventional manner.

The transducer is easily fabricated by anyone familiar with the metal-working art. Materials such as brass, aluminum or steel may be used for the various components. The device will operate satisfactorily on compressed air, steam or liquids such as oil or water.

The relative size of the grooves and piston displacements with respect to the pistons themselves have been exaggerated for clarity. In practical underwater transducers the piston displacements are quite small.

Obviously many modifications and variations of the present invention are possible in the light of the above teachings. It is therefore to be understood that within the scope of the appended claims the invention may be practiced otherwise than as specifically described.

What is claimed is:

1. A transducer for converting the energy of a steady flow of a first fluid medium to sound energy in a second fluid medium comprising, a housing having at least one wall which serves as a diaphragm to couple sound to said second medium, said housing including an internal portion defining a first cylindrical chamber, conduit means coupled to said housing to conduct said first fluid medium into said cylindrical chamber, a first piston connected to said diaphragm and slidably mounted within said chamber to form a wall thereof, and slidable valve means located in said conduit responsive to fluid flow therein to periodically block said flow.

2. A transducer according to claim 1 wherein said valve means is an integral part of said piston.

3. A transducer according to claim 1 wherein the said internal portion of said housing further defines a second cylinder and said valve comprises a second piston freely slidable therein.

4. A transducer according to claim 1 wherein said conduit between said valve means and said piston is divided into two portions connected in parallel, one a half wavelength longer than the other at the operating frequency of the transducer.

5. A transducer assembly comprising, a walled housing member, a pressurized fluid piston assembly means in said housing member and connected to the walls thereof to vibrate said walls, an electrically driven pump means mounted in said member to supply fluid under pressure to said piston assembly, a conduit connecting said pump and piston assembly means and a pressure responsive valve located in said conduit to continuously vary the flow rate in said conduit.

6. A transducer for converting the energy of a steady flow of a first fluid medium to sound energy in a second fluid medium comprising, a housing having at least one wall which serves as a diaphragm to couple sound to said second medium, said housing including an internal portion defining a first cylindrical chamber, conduit means coupled to said housing to conduct said first fluid medium into said cylindrical chamber, a first piston connected to said diaphragm and slidably mounted within said chamber to form a wall thereof, and a valve means entirely within said housing driven by said fluid flow to periodically reduce said flow.

7. The transducer according to claim 6 wherein said valve means comprises at least one port defined by said cylindrical chamber which is uncovered by said first piston.

8. A transducer according to claim 6 wherein said valve means comprises a second cylindrical chamber having a plurality of ports therein and a free piston means within said second chamber, the ports in said first and second chambers being interconnected by fluid passage ways, whereby a steady flow of fluid to said second chamber produces an oscillatory flow between said chambers.

References Cited by the Examiner
UNITED STATES PATENTS

| | | | |
|---|---|---|---|
| 1,563,626 | 12/25 | Hecht et al. | 116—27 |
| 2,558,089 | 6/51 | Horsley et al. | 116—137 |
| 2,587,848 | 3/52 | Horsley et al. | 116—137 |
| 2,804,042 | 8/57 | Gavreau | 116—137 |
| 3,004,512 | 10/61 | Bouyoucos et al. | 116—137 |

SAMUEL FEINBERG, *Primary Examiner.*
ARTHUR M. HORTON, BENJAMIN A. BORCHELT,
*Examiners.*